April 16, 1935.                B. BURNS                 1,998,154
               FILM DEVELOPING METHOD AND APPARATUS
                 Filed April 25, 1931        6 Sheets-Sheet 1

INVENTOR:
BRUCE BURNS,
BY
ATTORNEY.

INVENTOR:
BRUCE BURNS,
BY

ATTORNEY.

April 16, 1935.  B. BURNS  1,998,154

FILM DEVELOPING METHOD AND APPARATUS

Filed April 25, 1931  6 Sheets-Sheet 4

INVENTOR:
BRUCE BURNS,
By
Fad W Hamin
ATTORNEY.

April 16, 1935.  B. BURNS  1,998,154
FILM DEVELOPING METHOD AND APPARATUS
Filed April 25, 1931   6 Sheets-Sheet 5

INVENTOR:
BRUCE BURNS,
BY

ATTORNEY.

Patented Apr. 16, 1935

1,998,154

UNITED STATES PATENT OFFICE 1,998,154

FILM DEVELOPING METHOD AND APPARATUS

Bruce Burns, Los Angeles, Calif., assignor, by mesne assignments, to Hughes Industries Co. Ltd., Los Angeles, Calif., a corporation of Delaware Application April 25, 1931, Serial No. 532,805

23 Claims. (Cl. 95—94)

My invention relates to equipment for treating motion picture film, and relates particularly to a device for carrying out a film treatment in which the film is subjected to solutions and gases. Although my invention may be used to carry out various treatments, such as coloring, desensitizing, etc., the principal use to which I apply the invention is in the development of motion picture film, and accordingly this disclosure will be principally directed to the form of the invention especially suited for this latter use.

My invention comprehends a simple, efficiently operating device employing a minimum of moving parts subject to wear due to movement, whereby a closely supervised and constant treatment of a film may be performed. In continuous types of developing machines, relatively large numbers of rollers, pulleys, and sprockets are employed, with relatively intricate drive and control means for the sprockets and rollers. My invention accomplishes a pronounced reduction in the number of such parts employed in and likewise the cost of a developing machine without sacrificing control of the various steps of the treatment.

My invention also makes possible the development of a large number of films simultaneously in a device occupying a relatively small space as compared with the quantity of film or number of film strips treated.

It is an object of the invention to provide a device of this character in which the film strips are motivated through all of the steps by means of tension exerted near the point where the film leaves the film treating device. This tension exerting means is preferably situated outside the mechanism performing the last step of the treatment. In a developing machine such as hereinafter described, the last step of the treatment consists of a film drier, and following the film drier are pulling means adapted to exert sufficient tension in the film to cause it to move through the developer, intermediate wash, fixative, final wash, and drier.

The simplicity of construction and the small number of parts which may frictionally retard the film make it possible to cause movement of the film through the entire treating device by use of a tension which is very small as compared with the tension required to rupture the film.

A further object of the invention is to provide a device in which the film strips are moved through the various treating solutions on edge and in side by side relationship, and a further and important object is to provide in this film treating device containers for the film treating solutions having film apertures in the wall structures thereof situated below the top of the bodies of liquid within the containers. This novel feature of construction and operation makes it possible to place the containers in horizontal alignment so that the film strips may pass from one container to another in a straight line without bending or deflection thereof, which would require supports, such as rollers.

A further object of the invention is to provide a characteristic film gate for the containers adapted to receive the film strips on edge, being so constructed that they will hold the outflow of fluid from the containers at a minimum and will employ this fluid for centralization of the film strips in the film openings of the gates, this outflowing fluid also serving to lubricate the films as they pass through the apertures of the film gates.

My invention also includes a simple loading device for making it possible to change reels without interrupting the operation of the device and to load a relatively large number of films into the film treating device in a small space.

A further object of the invention is to provide in a device of this character a means whereby a sample or test strip of film may be withdrawn from the device at an intermediate point whereby to determine the results being obtained in the steps of the treatment preceding the point at which the test strip is taken off.

It is an additional object of my invention to provide apparatus of the character shown in which the flow of the treating fluids may be used to assist the passage through the apparatus of the strip of film being treated.

Further objects and advantages of the invention will be made evident throughout the following part of the specification.

Referring to the drawings, which are for illustrative purposes only.

Figure 1:
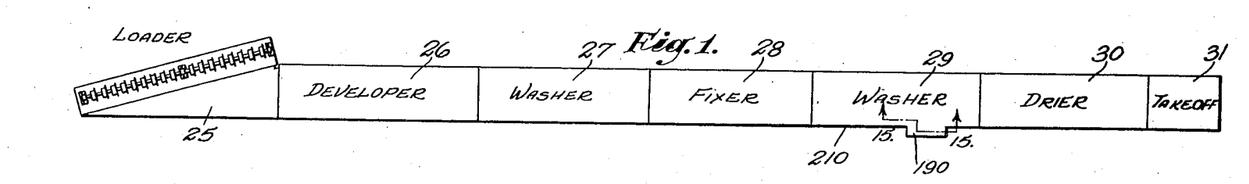
Fig. 1 is a schematic plan view showing the general arrangement of treating chambers employed in the preferred form of my invention consisting of a developing device.
Figure 2:
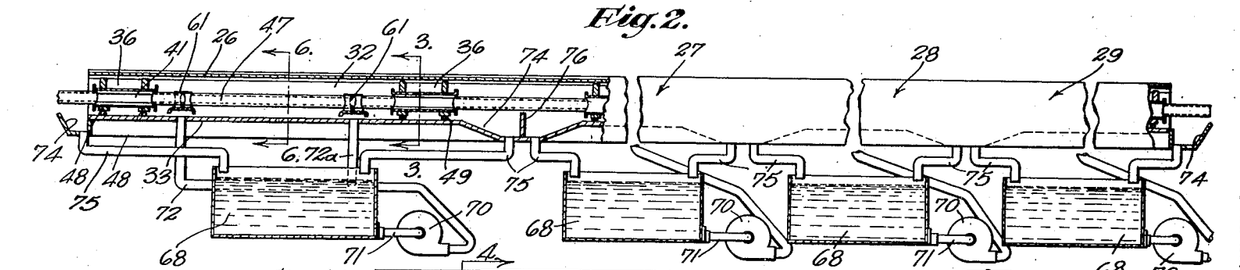
Fig. 2 is an enlarged, partly sectioned elevation of the liquid-containing treatment chambers of my invention.
Figure 3:
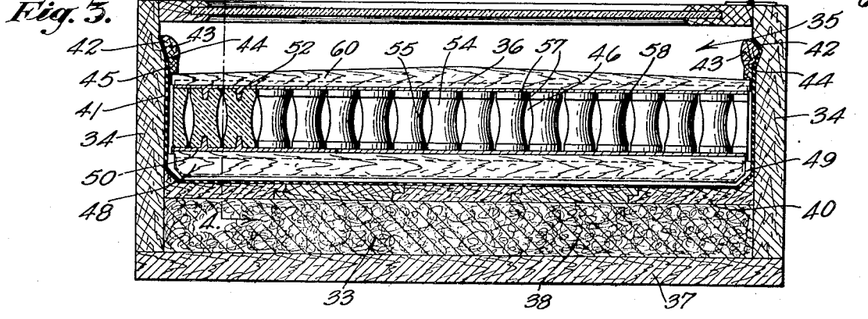
Fig. 3 is an enlarged cross section on a plane represented by the line 3—3 of Fig. 2.

In the preferred form of my film treating device consisting of a film developing machine, I employ, as schematically shown in Fig. 1, a loader 25, developer 26, washer 27, fixer 28, final washer 29, drier 30, and take-off 31. Although it is possible to employ other arrangements of the above parts, I may very satisfactorily practice my invention with the members 25 to 31 inclusive placed in rectilinear alignment, as shown in Fig. 1, as these elements are particularly suited and adapted for such arrangement. When these parts 25 to 31 inclusive are placed in a straight line, as shown in Fig. 1, the motion picture films being treated travel from one end of the developing device along straight lines of movement, and therefore do not require supporting pulleys or other supporting means which would frictionally retard the movement of the film. As shown in Fig. 2 and as further illustrated in detail in Figs. 3 to 7 inclusive, each of the members 26 to 30 inclusive includes a treating chamber 32 simply constructed in this practice of my invention by building up bottom and side wall structures 33 and 34 so as to form troughs 35, the front and rear ends of which troughs 35 are closed by wall or weir members 36. The bottom wall structure 33 consists of a lower wall member 37, an insulating layer 38, and flooring 40. The flooring 40 and the inner faces of the side walls 34 are covered with a material such as sheet rubber 41 which will not react in the presence of the chemicals contained in the treating solutions employed in the treating chambers or containers 32, the edges 42 thereof being secured to the walls 34 by strips 43 having their lower faces 44 sloped so as to retain wedges 45 which function to hold the walls or weirs 36 in position in the troughs 35. The weirs 36 are so constructed that they form walls for the treating chambers 32 having openings 46 of vertically elongated cross section through which films 47 may pass. The weirs 36 are constructed in the following manner: Cross strips 48 are supported on rubber tubes 49 which are compressed or flattened and form seals between the confronting faces of the strips 48 and the lining 41. On these cross strips 48 horizontal plates 50 having downwardly flanged edges 51 are supported, these plates having upwardly projecting conoidal pins 52 which project into openings 53 in the lower edges of weir strips 54 which are preferably molded from a non-reacting material, such as bakelite. These weir strips are quite long relative to their width, and the ends 55 thereof are tapered and rounded off in the manner shown so as to provide sloping approaches for the films which pass through the openings 46 between the weir strips 54. The weir strips 54 are centrally reduced in thickness, as shown at 56, and flat strip areas 57 are provided at the upper and lower edges of the weir strips 54 in position to confront the edges of the films 47. By centrally reducing the thickness of the weir strips 54, ample clearance is provided in the openings 46 adjacent the image carrying portions of the emulsions of the films to avoid any possibility of the images being injured by contact with the walls of the weir strips 54. On the upper faces of the weir strips 54 an upper plate 58, substantially identical in construction to the lower plate 50, is placed with its downwardly projecting pins 52 in engagement with the holes 53 in the upper faces of the weir strips 54. Upper cross bars 60 are placed across the upper plate 58, and the ends of the cross bars 60 are engaged by the wedges or filler members 45 which prevent upward movement of the upper cross bars 60 and hold the entire weir or wall 36 down with sufficient pressure to prevent its movement in the trough 35 under the conditions encountered in the operation of the device. The pins 52 of the lower and upper plates 50 and 58 space the weir strips so that the confronting upper and lower edge areas 57 thereof are separated sufficiently to pass a film splice.

Guide means 61 are placed intermediate the weirs 36, the number of these guide means employed being controlled by the length of the treating chamber 32 in which they are employed. In a treating chamber of ordinary length two guide means, as shown in Fig. 2, are sufficient. Each guide means consists of a plurality of spacer members 62 secured by pins 63 which project upwardly from a plate 64 having downwardly projecting flanges 65 along the edges thereof. The plate 64 is supported on blocks 66, and the pins 63 thereof are in such position as to hold the members 62 in staggered relationship in the spaces between the films 47. The members 62 are spool-shaped so as to be of reduced diameter intermediate their ends. The enlarged cylindrical ends 67 of the spacer members 62 are the only parts thereof which may engage the films 47; therefore, there is no possibility of injuring the image bearing portions of the emulsions by passing them through the spacer members of the guide means. The weir strips 54 and the spacers 62 are preferably in rectilinear alignment so that there is substantially no lateral deflection of the films as they pass through any one of the treating chambers 32.

Figure 4:
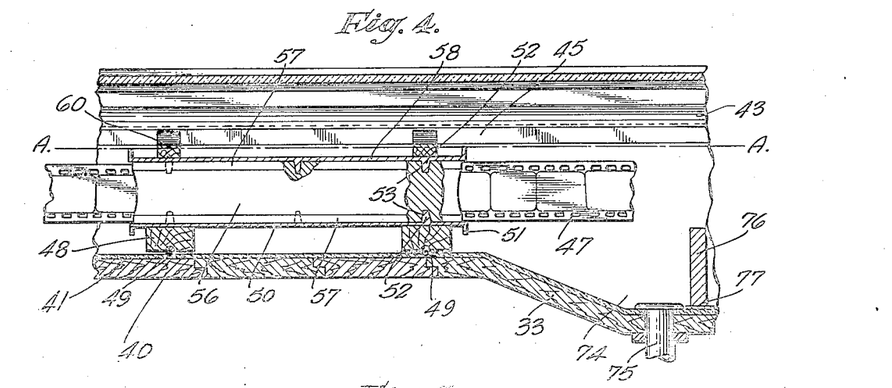
Fig. 4 is a cross section on a plane represented by the line 4—4 of Fig. 3.
Figure 5:
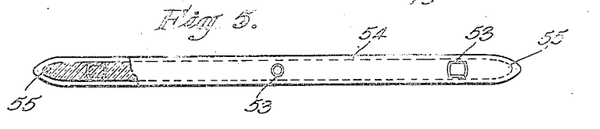
Fig. 5 is a partly sectioned, enlarged plan view of one of the two strips employed in the movable weir or wall structure of my invention.
Figure 6:
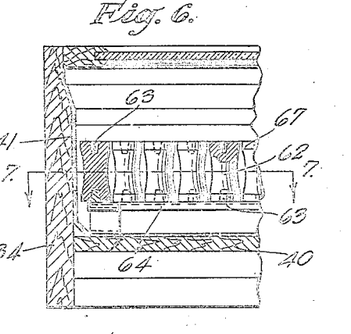
Fig. 6 is an enlarged fragmentary section on a plane represented by the line 6—6 of Fig. 2.
Figure 7:
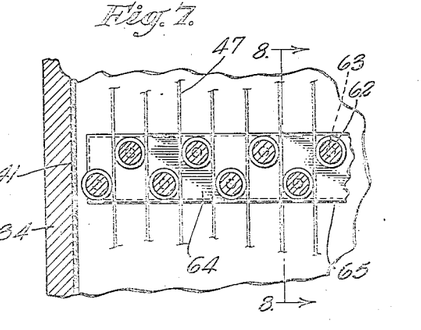
Fig. 7 is a fragmentary section on a plane represented by the line 7—7 of Fig. 6.
Figure 8:
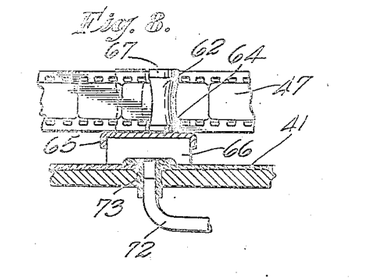
Fig. 8 is a fragmentary section on a plane represented by the line 8—8 of Fig. 7.

While passing through the container 32 of any one of the treating members 26 to 29 inclusive, the films are immersed in a treating liquid or solution, the level of which is maintained above the upper edges of the films 47, such as at the level indicated by the line A—A of Fig. 4. This level of liquid is preferably maintained by continuously feeding liquid into the container 32 from a reservoir 68, such as indicated in Fig. 2, there being a circulating pump 70 connected to the outlet 71 of the container 68 for forcing a continuous flow of liquid through pipes 72 and 72a which connect, as shown in Fig. 8, with a fitting 73 set into the bottom of the container 32 in a position underneath the plates 64 of the intermediate guide means. The plates 64 then serve as deflectors for changing the vertical flow of the incoming fluid to a lateral flow, thus preventing liquid at relatively high velocity from being directed against the films 47. The inflow of liquid is sufficient to compensate for the loss of liquid through the film openings 46 in the weirs or walls 36, thus maintaining the level A—A substantially constant. Adjacent each weir 36 a catch basin 74 is formed in the bottom structure 33 of the trough 35, these catch basins 74 receiving the overflow liquid which passes out through the weirs and communicating with the reservoir 68 through return pipes 75 connected with the basins, as shown in Figs. 2 and 4. The pipes 75, reservoir 68, pump 70, and pipe 72 or 72a constitute means for returning liquid from the catch basins 74 to the containers 32. The catch basins 74 between the containers 32 of the treating members 26 to 30 inclusive are separated by dividing walls 76 fitted in place with gasket means 77 to prevent leakage from one catch basin to another.

A feature of my invention is that the flow of fluid through the treating chamber may be employed to effect the movement of the films therethrough. In Fig. 2 I have shown inlet pipes 72 and 72a disposed adjacent the ends of the treating chamber of the developer 26 so that the flow of fluid into the treating chamber may be established at one end or the other of the treating chamber. For instance, by introducing the fluid through the pipe 72 and constricting the entering gate 36 at the leftward end of the developer 26 so that the leakage therethrough will be relatively small, and also positioning the gate or weir 36 at the rightward end of the developer 26 so that a larger leakage may occur therethrough, a definite flow of fluid may be established in the developer 26 in the direction of movement of the film, this flow tending to carry the film forwardly, thereby reducing the amount of tension required to pull the film through the treating device. Where it is desired to retard the movement of the film, the fluid may be caused to flow through a treating chamber in a direction opposite to the movement of the film. As an example, the fluid may be introduced through the pipe 72a and caused to flow leftwardly through the developer 26, thereby placing a retarding action on the film.

It will be noted that I have shown reservoirs 68 and circulating systems with each of the treating members 26 to 29 inclusive. The treating member 30 consists of a drier, and therefore no liquid or solution is required therein. In this drier 30 the films are merely conducted through a drying atmosphere consisting of a gaseous fluid, such as air. The air in the drier 30 is dried and heated before being circulated through the drier.

The chemical reaction produced in the emulsions of the films 47 in the treating liquids depends upon three factors—strength and temperature of solution, speed of travel of the film, and the distance through which the film travels in the treating liquid. In my device I may vary the chemical reaction by moving one or the other of the weirs 36 so as to change the distance which the films must travel through the liquid from one weir to another. In this manner I am able to vary one of the steps of the treatment without changing the other steps.

Figure 9:
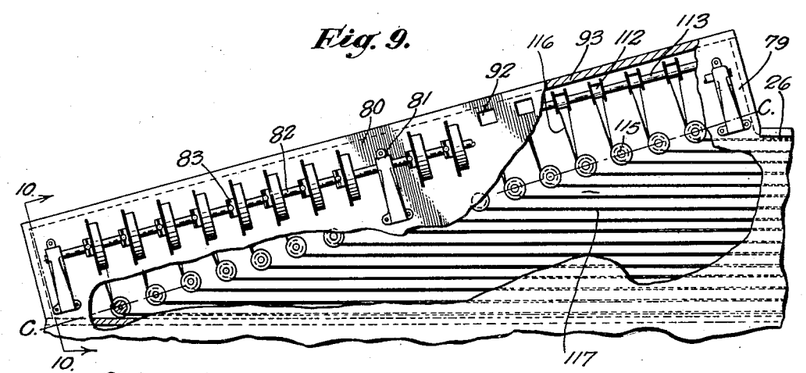
Fig. 9 is an enlarged, partly sectioned plan view of the loader shown in Fig. 1.
Figures 10, 11:
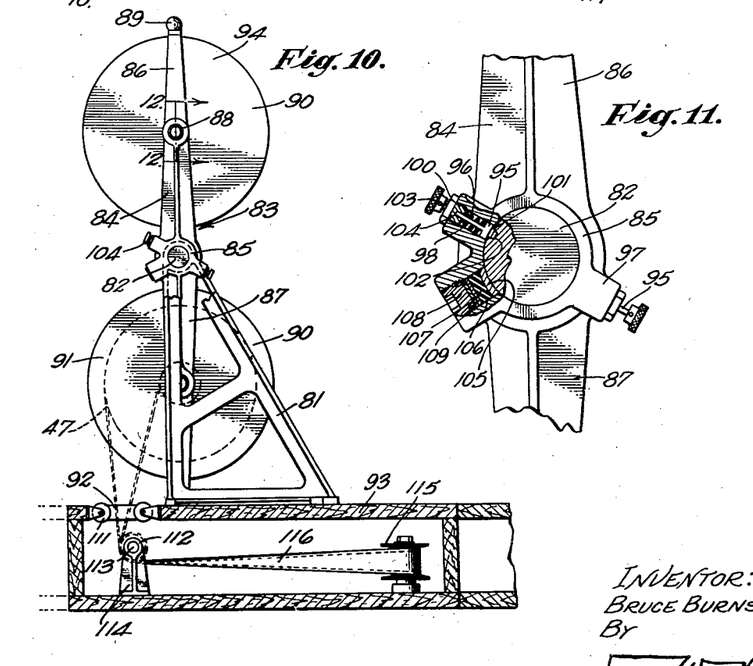
Fig. 10 is an enlarged cross section on a plane represented by the line 10—10 of Fig. 9.
Fig. 11 is an enlarged, partly sectioned view showing the detent mechanism, with the arms of the loader in operative position.
Figures 12, 14:
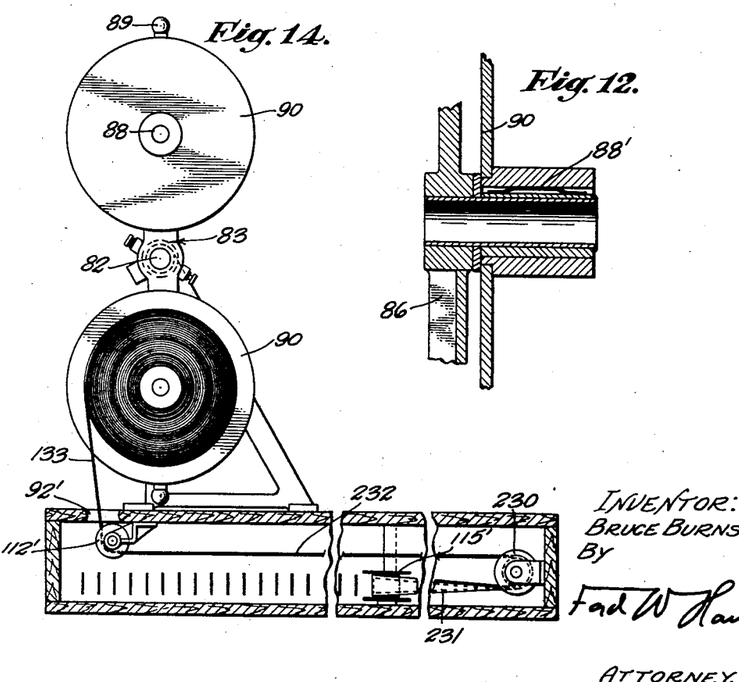
Fig. 12 is an enlarged fragmentary section on a plane represented by the line 12—12 of Fig. 10.
Fig. 14 is an enlarged cross section on a plane represented by the line 14—14 of Fig. 13.

My invention employs a novel loader 25 for loading the film treating device, this loader having a hollow table 79 connected to the front end of the treating member 26, this table having a diagonally directed front portion 80 on which brackets 81 are mounted for supporting a shaft 82 which carries a plurality of film spool supports 83. The film spool supports 83 each consist of a lever 84 having a central hub 85 which fits around the shaft 82, thereby pivotally supporting the member 84 and dividing the member 84 into a pair of oppositely extending arms 86 and 87, each of which is provided with an outwardly extending tubular stub shaft 88 adapted to receive a film spool 90 thereon, as shown in Figs. 9, 10, and 12, and having a spring means 88' for retaining the spool 90 thereon. The outer extremity of each arm 86 or 87 is provided with a ball or handle 89. The normal position of the film spool supports 83 is vertical, as shown in Fig. 10, and when in such vertical position, each film support 83 holds a film spool 90, as indicated at 91, in operative position relative to an opening 92 in the top 93 of the forward portion 80 of the table 79. While a film 47 is being unwound from the film spool indicated at 90, a full film spool may be placed as indicated at 94 on the upper stub shaft 88 so that by swinging the lever 84 through an angle of 180°, it will be possible to quickly bring such full film spool into operative position relative to the film opening 92. The preferred procedure is for the operator to note when the film is nearly completely unwound from the film spool and to pull the remaining portion to be unwound from the spool into a basket. The full spool on the upper end of the lever 84 is then swung down into lowered position, and the outer end thereof is secured to the end of the film in the film treating device. In this manner new films may be continuously fed into the film treating device without stopping the movement of the film through the various stages thereof.

As shown in Fig. 11, stop means are provided for holding the levers 84 in vertical position, consisting of pins 95 which are forced resiliently inwardly in the bores 96 of diametrally aligned bosses 97 by springs 98 which are held in place by plugs 100 so that the conoidal inner ends 101 of the stop or holding pins 95 may consecutively engage an opening or depression 102 in the shaft 82. The lever 84 may be released for rotation by pulling outwardly on the knob 103 of the forwardly extending pin 95 indicated at 104. In order to frictionally retard the movement of the lever 84 so that it cannot swing freely, I provide a friction plate 105 which rests on the bottom of a bore 106 and is forced into frictional engagement with the shaft 82 by means of a resilient body 107 adapted to be compressed by a screw plug 108 and spacer discs 109. The openings 92 may be equipped with guide rollers 111, as shown in Fig. 10, and below each opening a pulley 112 is mounted on a horizontal shaft 113 supported by brackets 114.

Under the top 93 of the table 79, vertical pulleys 115 are disposed along a diagonal center line C—C, as shown in Fig. 9, and, as shown in Figs. 9 and 10, each film 47 is conducted downwardly from a film spool 90 under a pulley 112. The film is then carried rearwardly, as indicated at 116, to a cooperating pulley 115. In passing from the pulley 112 to the pulley 115, the film is twisted through a quarter turn or angle of 90°, and as it leaves the pulley 115, as indicated at 117 in Fig. 9, the film is standing on edge and is in alignment with an opening 46 in the front weir of the first treating member 26 which, in this preferred form of the invention, is the developer.

Figure 19:
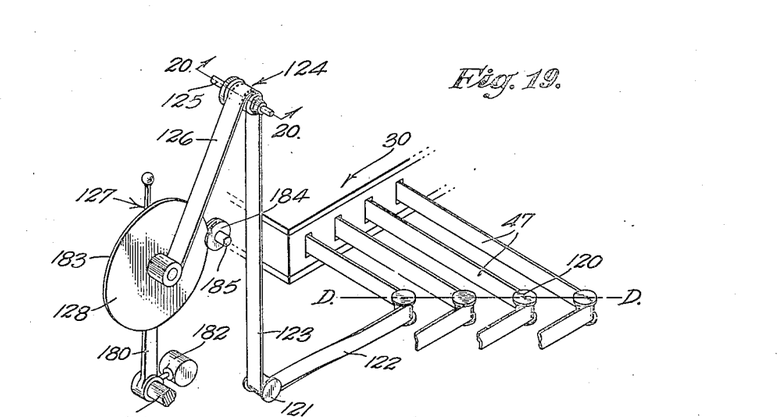
Fig. 19 is a diagrammatic perspective view showing the motivating means situated at the rear end of the drier of my film treating device for pulling the film through the treating device and spooling such film.
Figure 20:
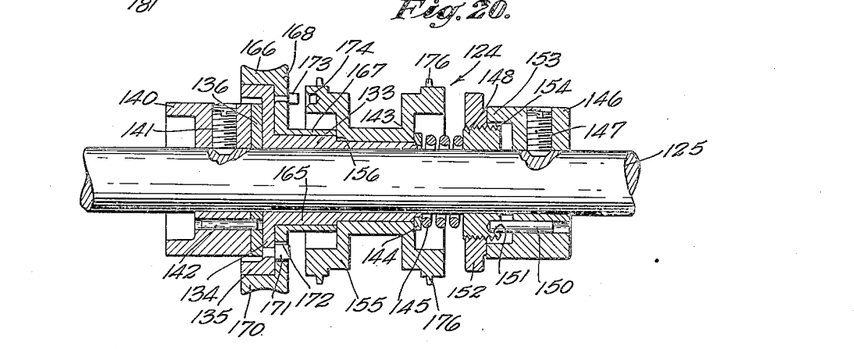
Fig. 20 is an enlarged section on a plane represented by the line 20—20 of Fig. 19, showing my improved yieldable and adjustable film pulling sprocket.

The films 47 are caused to move through the entire treating device by means situated adjacent the outlet of the drier 30, such means being indicated as the take-off 31, and being adapted to exert tension in the film so as to cause it to move through the treating device in response to a pulling action. In Fig. 19, which is a fragmentary perspective view of a number of films 47 leaving the drier 30, I show pulleys 120 mounted on vertical axes and disposed along a diagonal center line D—D. Each of these films 47 is bent forwardly around its pulley 120 and carried to a horizontal pulley 121, as indicated at 122, and then is carried vertically, as indicated at 123, over a pulling means or sprocket 124 mounted on a horizontal shaft 125. From the pulling sprocket 124 the film is carried, as indicated at 126, to a spooling means 127 removably carrying a film spool 128 on which the film is wound as received from the pulling sprocket 124. The pulling means 124, as shown in Fig. 20, includes a sleeve 133 which has a radial flange 134 and a cylindrical wall 135 at the periphery of this flange 134. The sleeve 133 is not keyed or fixed to the shaft 125 but is yieldably driven by the frictional engagement of the outer face of the flange 134 with a friction plate 136 carried on a collar 140 which is fixed to the shaft 125 by means of a set screw 141. To prevent rotation of the friction plate 136 relative to the shaft 125, a pin 142 is extended from the collar 140 into engagement with the leftward portion of the plate 136. The rightward, diametrally reduced end 143 of the sleeve 133 carries a flange washer 144 against which a compression spring 145 bears. Means for placing a desired compression in the spring 145 consists of a collar 146 fixed to the shaft 125 by means of a set screw 147, a sleeve 148 which is axially movable on the shaft 125 but is prevented from rotation relative thereto by a pin 150 which extends from the sleeve 148 into an opening 151 in the collar 146, and an adjustment nut 152 threaded on the sleeve 148 in a position to engage the wall 153 which surrounds a counterbore 154 in the leftward end of the collar 146. By rotating the nut 152 relative to the sleeve 148, the sleeve 148 may be caused to move axially and thereby vary the compression of the spring 145, which in turn varies the pressure with which the radial wall 134 is forced against the friction plate 136. Surrounding the rightward end of the sleeve 133 is a tubular sprocket member 155 which may rotate relative to the sleeve 133 but is prevented from axial movement thereon by the ring 144 and a shoulder 156 at the rightward end of a diametrally enlarged portion 165 of the sleeve 133. On the diametrally enlarged portion 165 is a clutch member 166 including an inner cylindrical wall 167, a radial wall 168, and an outer cylindrical wall 170 which fits over the cylindrical wall 135 of the sleeve 133. The clutch member 166 is caused to rotate with the sleeve 133 by means of a pin 171 which projects from the radial wall 168 through an opening 172 in the radial wall 169 of the clutch member. The clutch member 166 carries a pin 173 adapted to engage one of a plurality of holes 174 in the leftward end of the sprocket member 155; therefore, by moving the clutch member 166 rightwardly, the sprocket member 155 may be caused to rotate with the sleeve 133 which is yieldably and frictionally rotated by the shaft 125. It is therefore impossible to exert through the teeth 176 of the sprocket member 155 a tension sufficient to injure or break the film 47. The pull required to move the films 47 through the entire developing device is but a fraction of the breaking stress of the film, for the films move through the various treatment members 26 to 30 inclusive with a minimum of frictional resistance, this resulting from my simple construction, the motivating action of the unidirectional flow of fluids, the lubrication of the film strips by liquid which tends to centralize the film strips in the openings 46 of the weirs 36 as the liquid flows outwardly through the openings 46, and the movement of a greater portion of the film in rectilinear alignment.

The film spool 128 is mounted on a lever 180 which pivots on a horizontal shaft 181 and is caused to rotate in clockwise direction, when in raised position, by means of an eccentric weight 182, thus causing the periphery 183 of the spool 128 to be held in engagement with a grooved driving pulley 184 mounted on a shaft 185. The take-off per se is a distinct and separate invention and is disclosed in detail in my copending application entitled Film take-up mechanism, filed April 25, 1931, Serial No. 532,806.

Figure 15:
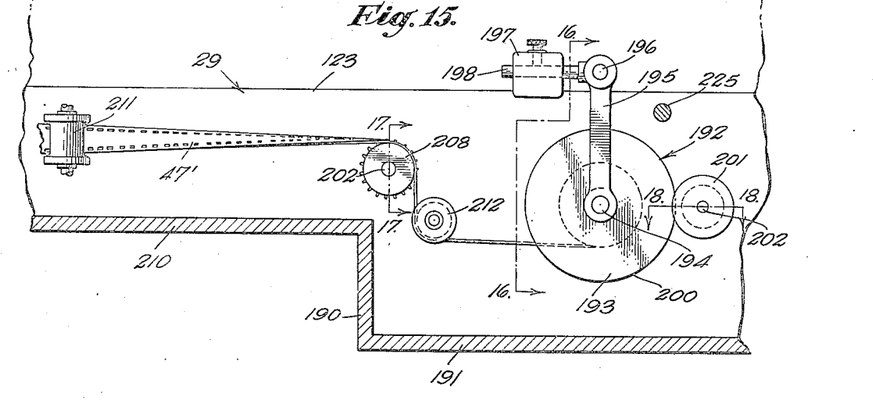
Fig. 15 is an enlarged longitudinal section on the line 15—15 of Fig. 1, showing the details of my test strip take-off.
Figure 16:
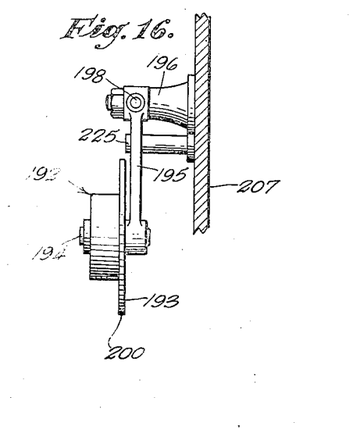
Fig. 16 is a section taken on a plane represented by the line 16—16 of Fig. 15.
Figure 17:
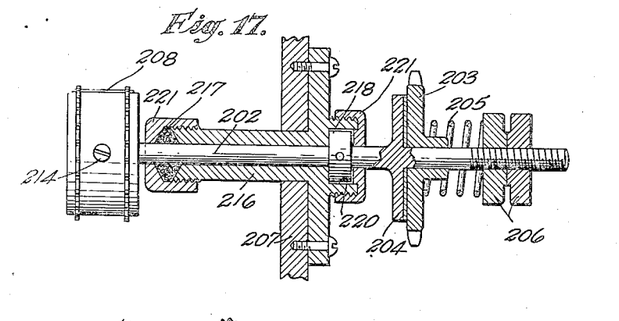
Fig. 17 is a section taken on a plane represented by the line 17—17 of Fig. 15.
Figure 18:
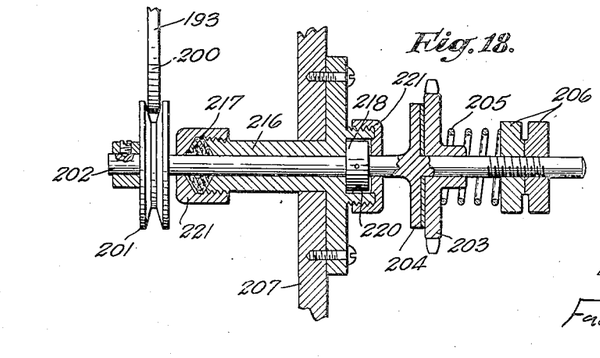
Fig. 18 is a section taken on a plane represented by the line 18—18 of Fig. 15.

In my invention I provide a means for taking off a test strip from one of the treating members. Illustrative of this I employ such a test strip take-off in the projecting part 190 of the treating member 29, the details of such take-off being shown in Figs. 15 to 18 inclusive. As shown in Fig. 15, the bottom 191 of the treating member 29 adjacent the projecting portion 190 thereof is downwardly offset to provide sufficient depth to receive a pulling means 192 consisting of a film spool 193 removably mounted on a stub shaft 194 carried at the lower end of a lever arm 195 which is pivoted, as shown in Figs. 15 and 16, on a bracket 196 and has an adjustable eccentric weight member 197 connected thereto by means of an extending rod 198, this eccentric weight 197 causing the lever 195 to swing in anti-clockwise direction, when the lever is in lowered position as shown in Fig. 15, whereby to cause the periphery 200 of the film spool 193 to engage a grooved pulley 201 which is mounted on a shaft 202 adapted to be yieldably driven through a sprocket 203 which is held in frictional engagement with a flange 204 on the outer end of the shaft 202, by a spring 205 which is adjustably compressed by the use of adjustment nuts 206. The film spool 193 is placed close to the outer wall 207 of the projecting portion 190, and the film spool is held in alignment with a pulling sprocket 208 adapted to receive the edge or first film 47' nearest the front wall 210 of the treating member 29. From the guide means 211 within the treating member 29, the film indicated at 47' is twisted through a quarter turn and conducted over the sprocket 208, from which it is directed downwardly around an idler pulley 212 and thence to the film spool 193. The sprocket 208, as shown in Fig. 17, is secured by means of a set screw 214 to the inner end of the shaft 202 having a drive sprocket 203 on its outer end held in frictional engagement with a flange or friction plate 204 by means of a spring 205 adjustably compressed by adjustment nuts 206, all being substantially duplicates of the parts shown in Fig. 18 for supporting the grooved pulley 201. The shafts 202 are supported in bearing members 216 having packing means 217 at their inner ends for preventing leakage. Thrust collars 218 formed on the shafts 202 are received in counterbores 220 at the outer ends of the bearing members 216 and are held in such counterbores by caps 221. The thrust collars keep the shafts 202 from moving axially in the bearing. It will be noted that this test strip take-off winds the film strip below the surface of the body of liquid 123 in the treating device 29, but the spool 193 may be placed on and removed from the stub shaft 194 above the level of the body of liquid 123, for it is possible to rotate the lever 195 in clockwise direction until the weight 197 engages a stop 225, at which time the lever 195 will be projecting vertically upwardly and the film spool 193 will be above the body of liquid 123 during its placement on and removal from the stub shaft 194.

Figure 13:
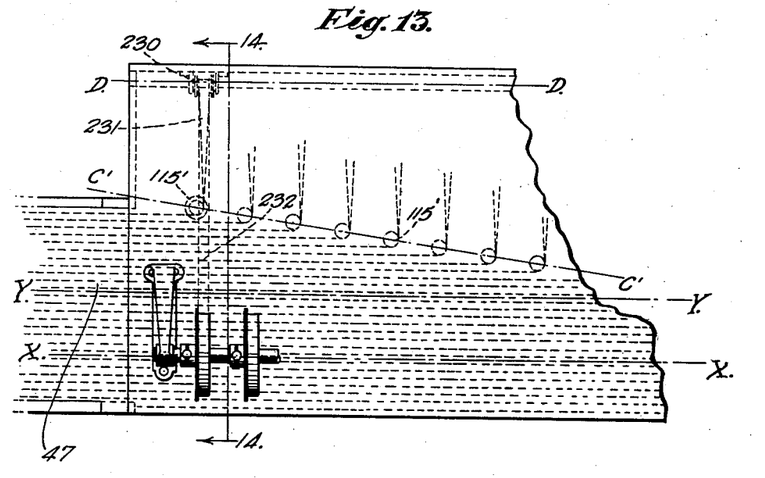
Fig. 13 is a fragmentary plan view showing an alternative form of loader.

In Figs. 1, 9, and 10, I have shown a form of loader for a film treating device in which the supports for the film spools are mounted on a line extending diagonally with respect to the longitudinal center line of the film treating device. In Figs. 13 and 14 I show a construction of a film loader embodying substantially the same principles as employed in the first form of film loader but in which the supports of the film spools are mounted on a center line X—X which is parallel to the longitudinal center line Y—Y of the film treating device. In this alternative form of the invention primary rollers 115', corresponding to the rollers 115 of Figs. 9 and 10, are mounted with their axes vertical and in a diagonal plane C'—C', the axes of the rollers 115' being situated at the points where the diagonal plane C'—C' intersects the planes in which the films 47 travel in parallelism. These films 47 are conducted to film rollers 230 which are disposed on a horizontal axis D—D. In passing from the rollers 115' to the rollers 230, the films are twisted through an angle of substantially 90°, as indicated at 231. Then, as indicated at 232, each film is extended forwardly from the roller 230 to a roller 112' situated below an opening 92' through which the film then extends, as indicated at 233, to a film spool 90 supported by a film spool support 83 of the same construction as described in detail in Figs. 10, 11, and 12.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A film treating device of the character described, including: a container having a weir opening below the normal liquid level and in an outside wall thereof; means for moving a film through said weir opening; and means for supplying liquid to said container.

2. A film treating device of the character described, including: a container having a weir opening below the normal liquid level and in an outside wall thereof; and means for moving a film through said weir opening by exerting tension on said film.

3. A film treating device of the character described, including: a container having inlet and outlet weir openings below the normal liquid level and in outside walls thereof; and means for exerting tension on a film to pull said film through said openings and said container.

4. A film treating device of the character described, including: a container having inlet and outlet weir openings below the normal liquid level and in outside walls thereof; means for exerting tension on a film to pull said film through said openings and said container; and means for adding liquid to said container in sufficient quantity to maintain the liquid level therein above the film in said container.

5. A film treating device of the character described, including: a container having inlet and outlet weir openings below the normal liquid level and in outside walls thereof; means for exerting tension on a film to pull said film through said openings and said container; and guide means in said container for guiding a film from the inlet opening to the outlet opening of said container.

6. A film treating device of the character described, including: a wall structure forming a treating chamber, there being a plurality of narrow, vertically elongated film openings in side by side position in said wall structure for receiving films on edge; and means for moving films through said openings.

7. A film treating device of the character described, including: a wall structure forming a treating cahmber, there being a plurality of narrow, vertically elongated film inlet and outlet openings in side by side position in said wall structure for receiving films on edge; and means for moving films through said inlet openings, the interior of said treating chamber, and said outlet openings.

8. A film treating device of the character described, including: a wall structure forming a treating chamber, there being a plurality of narrow, vertically elongated film openings in side by side position in said wall structure for receiving films on edge; guide means in said treating chamber for guiding said films on edge; and means for moving films through said openings.

9. A film treating device of the character described, including: a wall structure forming a treating chamber, there being a plurality of narrow, vertically elongated film inlet and outlet openings in side by side position in said wall structure for receiving films on edge; guide means in said treating chamber for guiding said films on edge; and means for moving films through said inlet openings, the interior of said treating chamber, and said outlet openings.

10. A film treating device of the character described, including: a plurality of treating members placed in alignment in a horizontal plane, said treating members having confronting walls with rectilinearly aligned relatively narrow vertically elongated film openings therein through which a film may pass on edge in substantially rectilinear alignment from one end of said film treating device to the other; and means for moving said film through said device.

11. A film treating device of the character described, including: walls forming a treating chamber, one of said walls being movable with respect to the other walls and having a film opening therein for receiving a film.

12. A film treating device of the character described, including walls forming a treating chamber having oppositely placed walls each with a film opening therein, one of such walls being movable with respect to the other in a manner to vary the size of said treating chamber.

13. A film treating device of the character described, including: a plurality of treating members placed in alignment in a horizontal plane, said treating members having confronting walls with film openings therein through which a film may pass in substantially rectilinear alignment from one end of said film treating device to the other, one of said confronting walls being movable with respect to the other walls of said treating member.

14. A film treating method of the character described, including: forming a body of treating fluid; moving a film from outside said body of fluid into said body of fluid in a plane below the upper extremity of said body of fluid; moving said film within said body of fluid; and moving said film out of said body of fluid.

15. A film treating method of the character described, including: forming a body of treating fluid; moving a film into said body of fluid in a plane below the upper extremity of said body of fluid; moving said film within said body of fluid; and moving said film out of said body of fluid in a plane below the upper extremity thereof.

16. A film treating method of the character described including: forming a body of treating fluid; moving a film strip on edge into said body of fluid below the surface level thereof; moving said film strip in a longitudinal path through said fluid; and moving said film strip out of said body of fluid.

17. A method of treating a film strip which includes: conducting said film strip into a walled receptacle containing a treating liquid and having an opening in an outside wall thereof below the level of said liquid adapted to receive said film strip; allowing said treating liquid to flow out of said opening around said entering film strip; pulling said film strip through said receptacle in submerged position; and pulling said film out of said receptacle.

18. A method of treating a film strip which includes: causing said film strip to enter a container of treating liquid below the surface level of said liquid; causing said treating liquid to flow out of said container around said incoming film strip; moving said film strip through said treating liquid in submerged position; causing said film strip to pass out of said container of treating liquid below the surface level of said liquid while allowing said liquid to flow out of said container around said exiting film strip; and maintaining the surface level of said treating liquid at substantially the same point throughout the said treatment.

19. A method of treating a film strip which includes: pulling said film strip on edge into, through and out of a container of treating fluid having relatively narrow vertically elongated inlet and outlet film openings below the surface level of said treating liquid; allowing said treating liquid to flow out of said container through said inlet and outlet film openings while said film strip is passing therethrough; and replenishing the supply of treating liquid in said container to compensate for the amount of said liquid which flows out of said film openings to keep the level of said treating liquid at all times above the upper edge of said film strip.

20. A film treating device of the character described including: a wall structure forming a treating chamber, there being a relatively narrow vertically elongated film opening in said wall structure adapted to allow a film to pass therethrough on edge; and means for moving a film through said film opening and said treating chamber.

21. A film treating device of the character described including: a wall structure forming a treating chamber, there being a relatively narrow vertically elongated film inlet opening in one portion of said wall structure and a relatively narrow vertically elongated film outlet opening in another portion of said wall structure; and means for moving a film longitudinally on edge through said inlet opening, the interior of said treating chamber and out through said outlet opening.

22. A film treating device of the character described including: a walled container one of said walls being formed as a weir composed of a plurality of centrally reduced weir strips in spaced parallel position to form a plurality of openings in said weir.

23. A film treating fluid container of the character described including: a base; a pair of oppositely facing side walls; and a pair of oppositely facing weirs to form the end walls of said container each of said weirs being adapted to pass a film strip therethrough in edge position.

BRUCE BURNS.